*INVENTORS*
WALTER H. HOLCROFT
GEORGE D. BLAIR
BY *Whittemore Hulbert & Belknap*
ATTORNEYS Oct. 1, 1963  W. H. HOLCROFT ET AL  3,105,863
HEAT TREATING APPARATUS
Filed Nov. 23, 1959  5 Sheets-Sheet 2
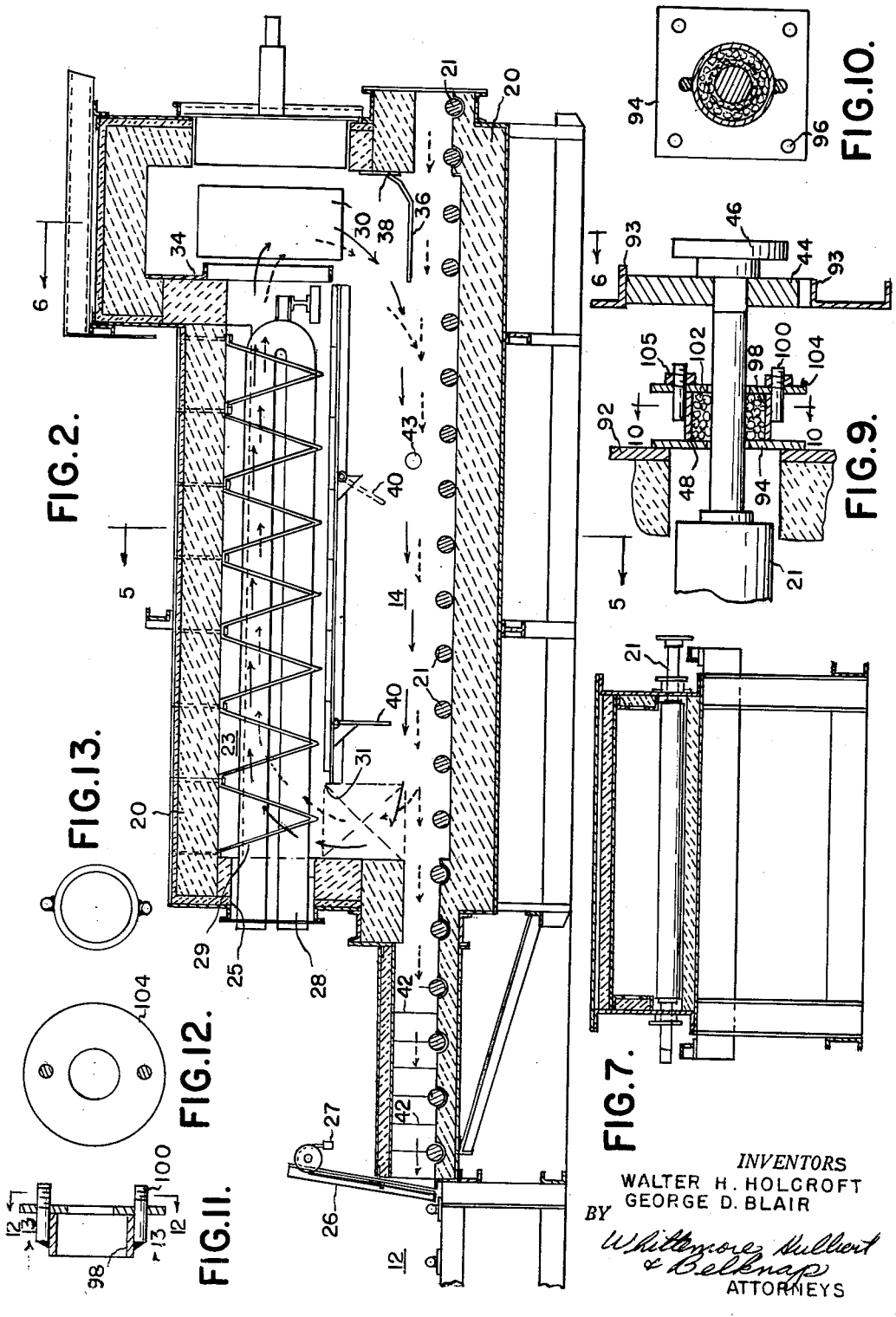
INVENTORS
WALTER H. HOLCROFT
GEORGE D. BLAIR
BY
Whittemore Hulbert
& Belknap
ATTORNEYS

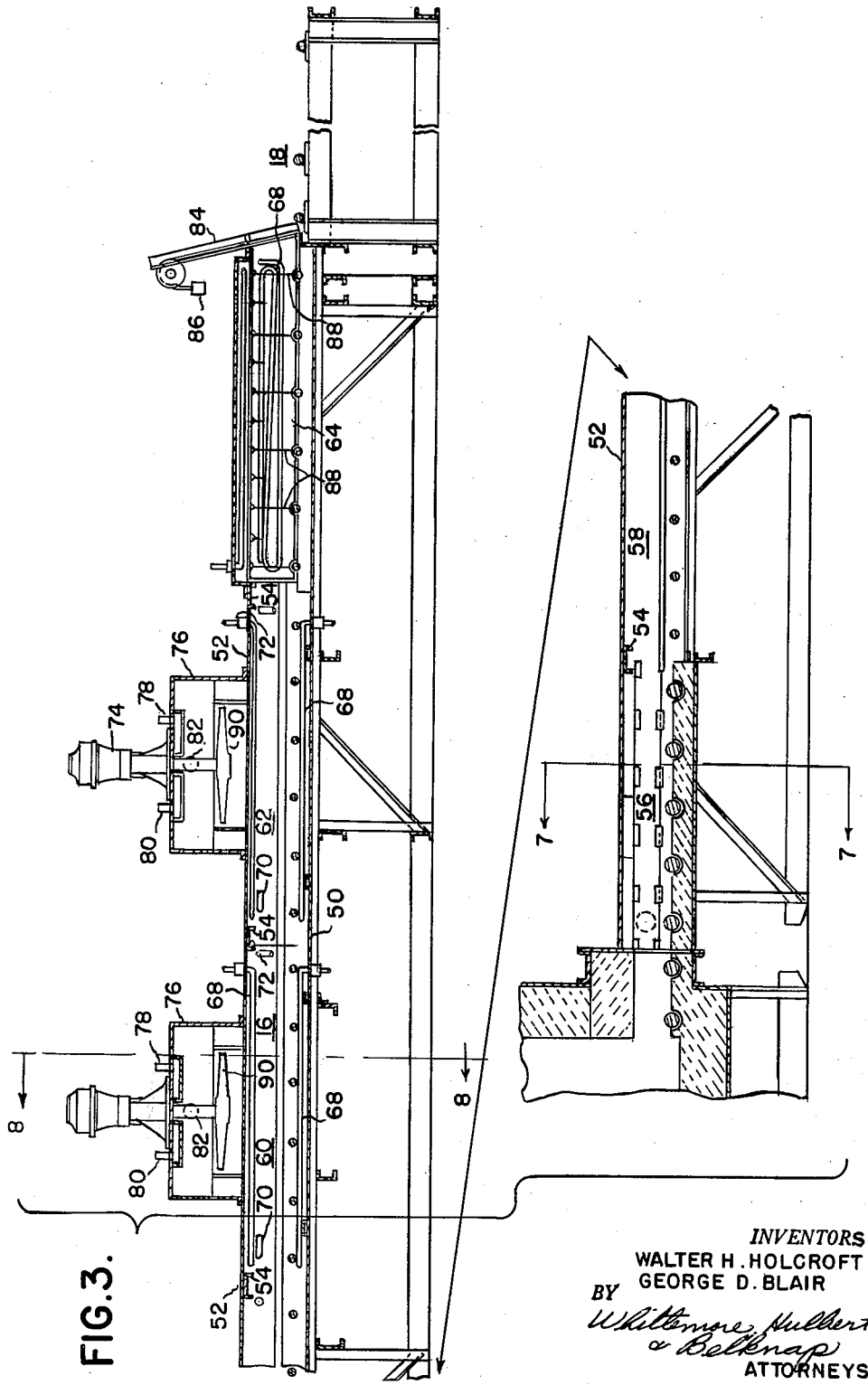

Oct. 1, 1963  W. H. HOLCROFT ET AL  3,105,863
HEAT TREATING APPARATUS
Filed Nov. 23, 1959  5 Sheets-Sheet 4
FIG.5.
FIG.14.
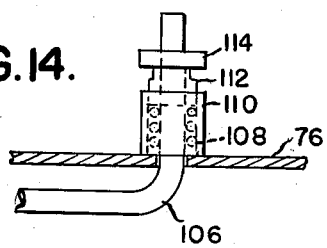
FIG.8.
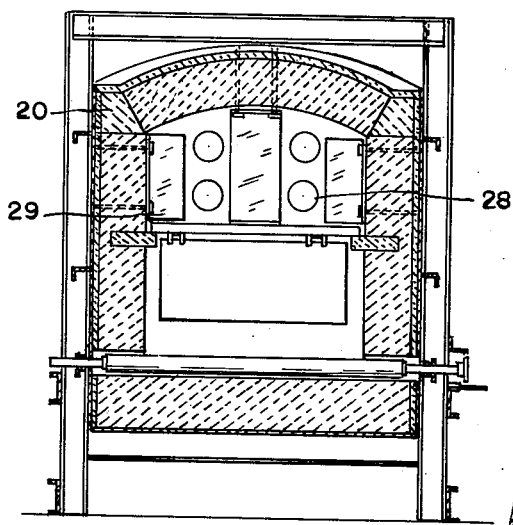
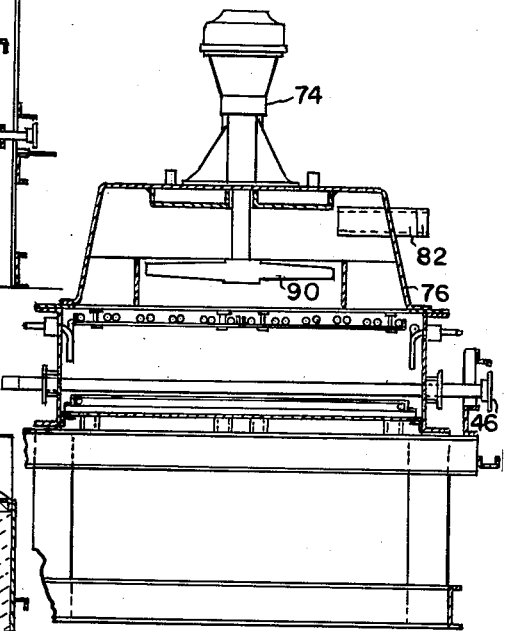
FIG.6.
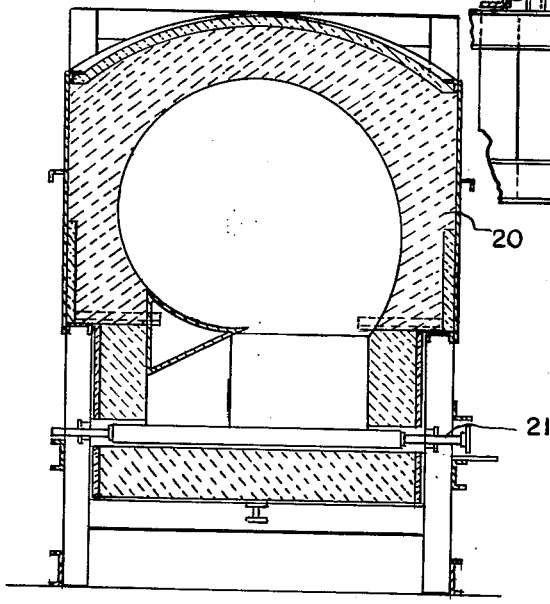
*INVENTORS*
WALTER H. HOLCROFT
BY GEORGE D. BLAIR
ATTORNEYS Oct. 1, 1963 W. H. HOLCROFT ET AL 3,105,863
HEAT TREATING APPARATUS
Filed Nov. 23, 1959 5 Sheets-Sheet 5

INVENTORS
WALTER H. HOLCROFT
BY GEORGE D. BLAIR

Whittemore, Hulbert
& Belknap
ATTORNEYS

United States Patent Office 3,105,863
Patented Oct. 1, 1963

3,105,863
HEAT TREATING APPARATUS
Walter H. Holcroft, Detroit, and George D. Blair, Livonia, Mich., assignors to Holcroft & Company, Detroit, Mich., a corporation of Michigan
Filed Nov. 23, 1959, Ser. No. 854,904
1 Claim. (Cl. 266—5)

The invention relates to an industrial type of heat treating unit requiring a controlled gas atmosphere. This invention further relates to a heat treating unit of the type in which the work travels through the heating and cooling cycles from one point to another thereof and is enveloped in a gas atmosphere during such travel. Use of controlled atmosphere to envelop the work in process enables the heat treater to control closely the surface appearance as well as the chemical and physical properties of the work.

More particularly, this invention relates to a radiant tube fired, convection-heated, roller hearth, industrial furnace or unit having an improved exothermic gas converter or generator associated therewith. The unit may be used for annealing and other metal processing purposes including clean annealing, bright annealing, and stress relieving of nonferrous metals.

Still further, this invention relates to the manner in which the gas atmosphere is directed into the heat treating unit and the way the gas atmosphere is utilized to obtain increased efficiency during both the heating and cooling cycles.

It is an object of this invention to provide an improved industrial furnace having a highly efficient heat absorbing cooling tunnel connected thereto in which the gas atmosphere is initially directed.

It is another object of the invention to provide a relatively simple type of industrial heat treating unit capable of being readily operated with a minimum amount of attention on the part of personnel and also being of a design which enables installation in a substantially smaller space than previously used and at a minimum cost.

Still another object of this invention is to provide an improved, more efficient and economical means for introducing the gas atmosphere into the heat treating unit. Briefly, the invention may be described as having a furnace which is heated by U-shaped radiant tubes mounted lengthwise in an insulated heating chamber. The cooling section is composed of a shell of single steel construction and is connected to the outlet of the furnace. A pair of propeller type fans mounted on the cooling shell in the external housings with directional vanes control the flow of atmosphere from a gas converter and direct the atmosphere initially into the cooling zone and then into the heating chamber where a single high volume squirrel cage type fan circulates the furnace atmosphere around the heating tubes and thoroughly around and through the work being processed. With this combination heat is transferred to the stock moving through the furnace by convection thus achieving efficient and uniform heating throughout the entire operating range of the furnace which varies from 500° F. to 1350° F. In addition to the propeller type fans controlling the flow of the atmosphere, the fans also help to initially accelerate the transfer of heat from the stock to the gas atmosphere in the cooling section as it flows into the heating chamber and also aids in the transfer of heat from the stock to the cooling water coils provided in the cooling section.

A further object of this invention is to provide a heat treating unit assembly having greatly increased cooling and heating efficiency while materially reducing its overall size, cost and required floor space for operation.

A still further object of the invention is to provide means for maintaining or baffling a slight pressure inside of the heat treating unit so as to effect an adequate amount of the protective atmosphere to flow out through the tubing as it enters and leaves the unit, thereby purging entrained air from the tubing as it enters the furnace and preventing air from entering the cooling section as the tubing leaves the unit.

A still further object of the invention is to provide an improved and more efficient exothermic gas converter having a novel water cooled jacket associated therewith for facilitating the transfer of heat from the combustion chamber to the cooling water provided in the jacket.

Another object of the invention is to provide an improved hot pack gas seal for utilization around the furnace rollers which extend from the furnace case.

Other objects of the invention will become apparent as the following description proceeds especially when taken in conjunction with the accompanying drawings, wherein:

FIG. 2 is a vertical longitudinal section showing only the heating zone, furnace or section of the industrial heat treating unit and the flow of the atmosphere therethrough;

FIG. 3 is a vertical longitudinal section showing the cooling zone of the industrial heat treating unit;

FIG. 5 is a sectional view taken on the line 5—5 of FIG. 2;

FIG. 6 is a sectional view taken on the line 6—6 of FIG. 2;

FIG. 7 is a sectional view taken on the line 7—7 of FIG. 3;

FIG. 8 is a sectional view taken on the line 8—8 of FIG. 3;

FIG. 9 is an elevation showing the way in which the hot pack gas seal is utilized around the right end of the furnace roller shown in FIGURE 7 where it emerges from the furnace.

FIG. 10 is a view taken on line 10—10 of FIG. 9;

FIG. 11 is a sectional elevational view showing the structural parts of a modified hot gas pack seal;

FIG. 12 is a front view of the seal plate taken on line 12—12 of FIGURE 11;

FIG. 13 is a back view showing the projecting studs connected to the cylindrical member taken on line 13—13 of FIG. 11;

FIG. 14 shows the manner of sealing the copper tubing projecting from the cooling section;

Figure 1:
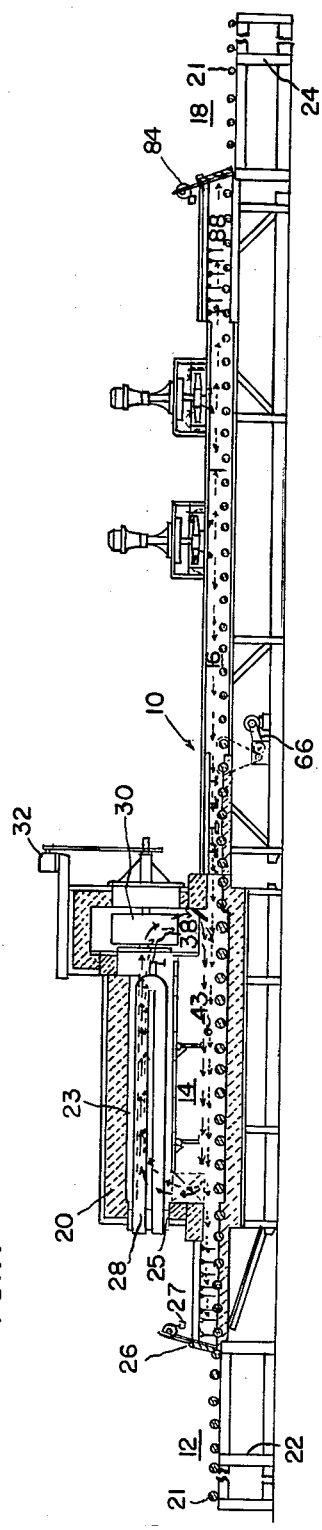
FIG. 1 is a vertical longitudinal section showing the novel path of travel of the atmosphere in the improved industrial heat treating unit.

The industrial heat treating unit 10, to be discussed herein, is mounted above the floor as is shown in its entire length in FIG. 1 and may be divided into the entrance section 12, the heating zone 14, the cooling zone 16, and the exit section 18. The walls of the heat treating unit 10 which define the heating zone 14 are formed of a high heat resistant refractory material 20 such as insulating fire brick, mono block insulation or other suitable material.

The work is placed on power driven rollers 21 at the entrance section 12 where it travels longitudinally through the heating and cooling zones 14 and 16 respectively to the exit section 18. The loading table 22 and the unloading table 24 are included in the entrance section 12 and the exit section 14 respectively. A typical installation would cover approximately 74' including the loading and unloading tables, with 12½' of length devoted to heating and an additional 30' devoted to cooling. Tubling is moved entirely through the unit 10 which has an effective hearth width of approximately 3½' and a work clearance above the rollers of 6". Long lengths of tubing are run directly on the rollers 21 while short lengths are processed in mesh pans which travel directly on the rollers 21. The unit 10 or furnace as described herein will process up to 4000 lbs./hour of copper tubing at 1200° F. The same unit is also rated to handle 2400 lbs./hour of aluminum tubing at 750° F.

The various zones and sections are supported by appropriate structural steel channels, angles, I-beams (unnumbered) etc., so as to be suitably raised off the ground, thereby rendering it unnecessary to provide subfloor installations. A door 26 is positioned at the entrance to the heating zone 14 and is effectively counterbalanced by a suitable weight or by other conventional means as illustrated at numeral 27. An insulated heating chamber 23 is provided to heat the zone 14 to the desired temperature. This is accomplished by a plurality of radiant-type U tubes or burners 28 supported lengthwise within the heating chamber 23. In FIG. 5, two U-shaped tube burners 28 are shown, although it will be understood that the number of burners may be varied to suit different requirements.

As shown in the specific embodiment of the invention selected herein for the purpose of illustration, the burners 28 are spaced equal distances from each other lengthwise of the heating zone 14 and respectively project through openings 25 formed in the end wall of the furnace.

The burners 28 per se which form no part of the invention are identical in construction and a description of one will suffice for both. Gas and air are introduced separately into the tube 28 and are progressively mixed by a controlled diffusion after they pass through the tube, thus providing an ideal luminous flame. The heating medium may be gas, oil, electricity. The tubes 28 are heated by the flame and in turn radiate their heat to the surrounding furnace walls 20 and stock. Suitable expanded metal zigzag heat baffles 29 are utilized in the heating chamber 23 to help in radiating the heat throughout the chamber 14 and permit the circulated atmosphere to absorb the heat.

A single high volume squirrel cage impeller type fan 30 driven by a suitable electrical motor 32 circulates the furnace atmosphere around the heating tubes 28 as well as thoroughly around and through the work being processed. A fan shroud 34, as best shown in FIG. 2, is installed in the furnace before closing or bricking the walls. The fan 30 may be of such a size to circulate 15,000 cu. ft. of atmosphere per minute. With this arrangement the heat is transferred to the stock or work by convection; thus, achieving efficient and uniform heating throughout the entire operating range of the furnace which is normally between 500° F. to 1350° F. It is possible to maintain a temperature uniformity within the furnace to as close as plus or minus 5° F. A directional chute or plate 36 is connected to the duct 38 of the fan 30 for directing the flow of atmosphere inwardly towards the work and preventing the atmosphere from reversing itself and returning to the cooling zone 16 as will be explained in more detail later.

Located in the heating zone 14 is a pair of baffles 40 which are hingedly connected to a duct plate mounted below the radiant tubes 28. The duct plate is insulated to prevent radiation of heat from the radiant tubes to the work thus assuring close temperature uniformity throughout the operating range. The baffles 40 are located in the chamber during erection of the furnace and are provided for the specific purpose of holding the flow of atmosphere as close to the work as is possible and thereby help to insure that the furnace atmosphere is circulated thoroughly around and through the work being processed. A plurality of fiber glass curtains 42 are provided at the entrance to the heating chamber 14 and help to provide a suitable back pressure in the furnace to purge the air entrained in the tubing entering the furnace. A thermocouple 43 is located in the heating zone 14 to control the temperature.

Figure 4:
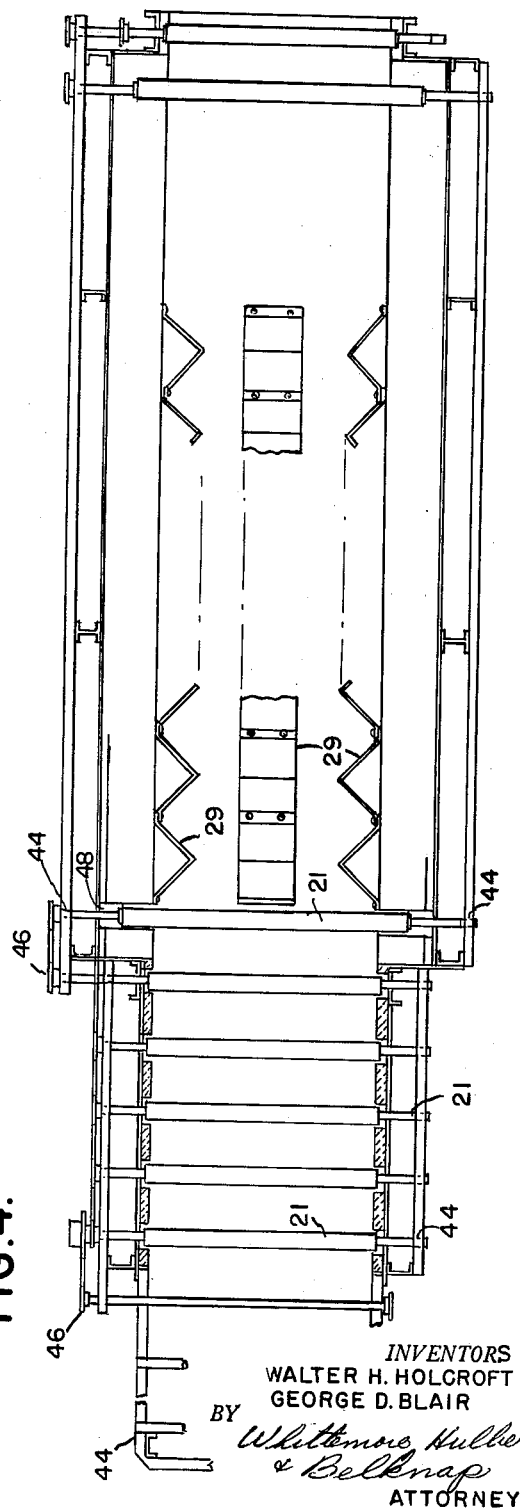
FIG. 4 is a plan view of the industrial heat treating unit shown in FIG. 2—2.

Reference to FIG. 4 shows that the powered rollers 21 are of various sizes depending on their particular location in the furnace unit. The rollers 21 are mounted lengthwise in the unit so that the ends emerge from the sides of the unit 10. Each end is mounted on an appropriate pillow block bearing 44. On one of the ends of each roller 21 is located a sprocket 46 which is driven by an appropriate chain drive at a predetermined speed. The rollers 21 in the heating unit 14 and the cooling tunnel 16 are driven by a variable speed drive so as to vary the time required for the heating and cooling cycles. Appropriate chain guards (not shown) cover the chain mechanism driving the rollers.

The rollers which extend through the sides of the heating chamber 14 are provided with hot pack gas seals 48 at the projecting places. Heretofore, water cool bearings were employed at considerable expense. It is now possible to insulate the pillow block bearings 44 from the heat by use of the hot pack gas seals 48 as shown in FIG. 9 as will be explained in more detail later on.

Adjacent the heating chamber 14 is the cooling zone 16 which is constructed of a single steel shell 50 to provide a highly efficient heat absorbing tunnel. The shell 50 has a plurality of removable cover plates 52 which are fastened to channel members 54 as best illustrated in FIG. 3. For discussion purposes, the shell 50 may be considered to be divided into five sections corresponding to each of the five cover plates 52. The shell sections are designated 56, 58, 60 and 64 with shell section 56 being connected to the outlet side of the heating chamber 14. Section 56 is insulated and has rollers 21 of the same heat resistant alloy as the ones employed in the heating unit. The rest of the shell sections utilize steel rollers 21. The heating and cooling periods are controlled by the variable speed drive 66 which is connected to the rollers, as is shown in FIG. 1 so that the time in the heating zone may be varied from 4 to 10 minutes with corresponding cooling periods in the cooling zone 16 between 10 and 25 minutes for annealing copper tubing.

Shell sections 58, 60 and 62 each employ copper cooling coils 68 at the top, bottom and sides of the shell 50 as best illustrated in FIG. 3. The cooling coils 68 on the bottom must be placed before the rollers are installed. The exit tunnel or shell section 64 has insulation on the bottom of the rollers with copper coils 68 employed on the top and sides. The coils 68 have a serpentine form. Each coil 68 has its pair of ends extending through the shell 50 so as to provide an inlet connection 70 and an outlet connection 72. The inlet connections 70 are connected to a source of water by appropriate plumbing. The outlet connections 72 are also connected by suitable plumbing to the drain.

A pair of thermocartridge assemblies each having a propeller type fan 74 are mounted in external housings 76 which are connected to the top of the shell sections 60 and 62 by suitable fastening means. Each of the housings 76 has a water inlet connection 78 and outlet connection 80 which are connected by appropriate plumbing to a source of water. This provides a means of transferring heat from the housing to the water. A gas atmosphere inlet 82 is located in each housing as best illustrated in FIG. 8. The inlet 82 is connected to the gas generator as will be explained later.

An exit door 84 is provided at the end of the cooling tunnel and is suitably counterbalanced by weight 86. A plurality of hinged fiber glass curtains 88 are located in the shell section 64 and help to create a back pressure to prevent air from infiltrating the chamber.

It suffices to say at this time that the gas atmosphere enters the housing 76 through the inlet 82 and is circulated in the cooling tunnel 16 by the directional vanes 90 of the fans 74 to accelerate the transfer of heat from the stock to the cooling water. In addition, the gas atmosphere flowing through the cooling tunnel picks up heat from the stock being cooled so that it enters the heating chamber 14 very close to the selected heating temperature. Thus increase in both cooling and heating efficiency results.

FIG. 9 shows the right end of the roller 21 shown in FIG. 7 extending through the side 92 of the furnace and having the reduced outer part thereof mounted in a pillow block bearing 44 which is supported by appropriate structural steel 93. The sprocket 46 is connected to the roller 21 at its furthermost outer point. The hot pack gas seal 48 is comprised of a plate 94 as is shown in FIG. 10 which has a plurality of holes 96 therein in which appropriate fastening means, such as bolts and nuts secure the plate 94 to the wall 92. A cylindrical member 98, as an example a part of a standard 2½" round pipe, is welded to the plate 94 and has a pair of threaded studs 100 projecting longitudinally from the end of the member 98. Asbestos rope 102 is wrapped around the reduced part of the roller 21 which extends through the cylindrical member 98 to provide effective and economical means for insulating the bearing 44 from the furnace heat. A plate 104 is placed around the reduced end of the roller 21 so as to engage the studs 100. Hex nuts 105 secure the plate 104 to the studs 100 and thereby provides an efficient hot pack gas seal 48.

It is possible to modify the hot pack gas seal 48 as shown in FIG. 11 by welding the cylindrical member 98 to the furnace wall 92. The space between the cylindrical member 98 and the roller end 21 is filled with asbestos rope which is compressed by bolting a closing plate 104 to the studs 100.

The copper tubing utilized in the cooling section as part of the serpentine coils also has an appropriate sealing means as is shown in FIG. 14. The copper tubing represented by numeral 106 extends outwardly through the side of the housing 76. Asbestos rope 108 is wrapped around the tubing and an annular coupling member 110 is extended over the tube to encompass the asbestos rope 108 and is welded to the side of the housing 76. The coupling member 110 has a recess in which is inserted an adjustable member 112. A bushing 114 is provided for locking the members in their positions.

Figure 16:
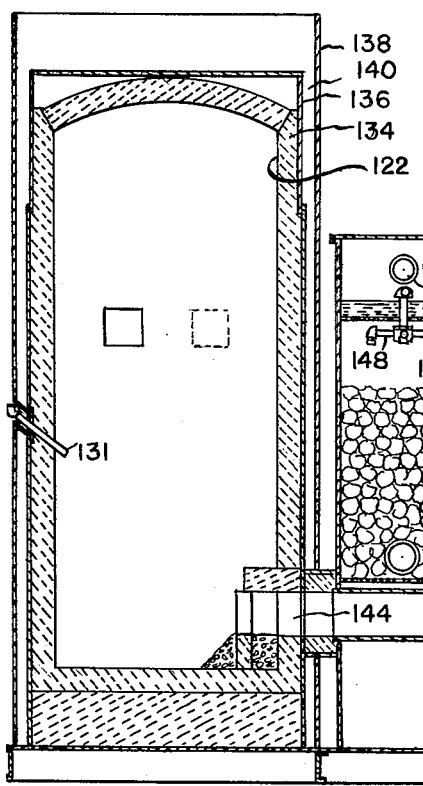
FIG. 16 is an elevational view in section of the exothermic gas generator showing in particular the water jacket surrounding the combustion chamber.
Figure 15:
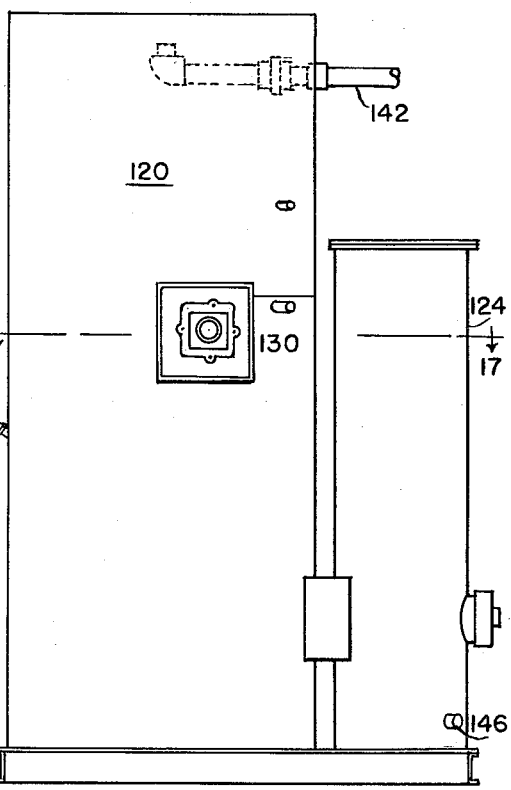
FIG. 15 is a front view of the exothermic gas generator.
Figure 17:
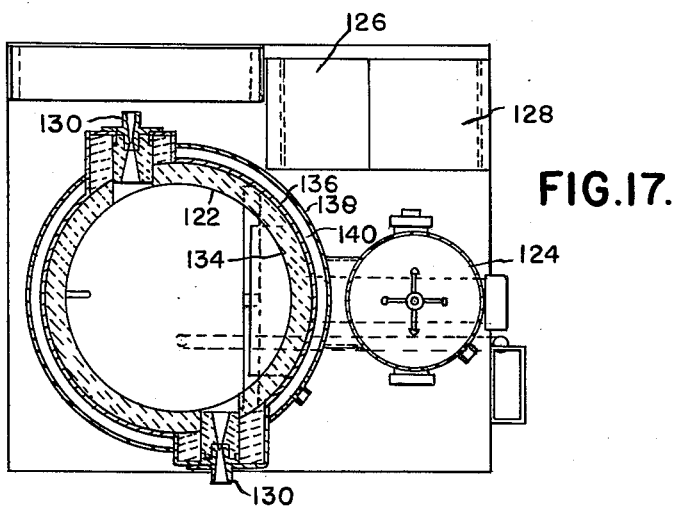
FIG. 17 is a plan view of the exothermic generator section, taken on the line 17—17 of FIG. 15.

The controlled atmosphere introduced into the furnace, to protect the work from oxidizing during annealing, is prepared in an improved exothermic gas converter or generator. The exothermic gas generator 120 as shown in FIGS. 15–17 utilizes an air-gas mixture which is burned in a reaction or combustion chamber 122 after which the products of combustion are passed through a contact type water spray tower 124 where the mixture is cooled and the excess water vapor removed to prevent condensation in the piping. The reaction when using a 10:1 gas-air mixture (with natural gas the hydrocarbon) is approximately as follows: $CO_2$ 11%, $H_2O$* 2.47%, $O_2$ 0%, $CO$ .5%, $H_2$ .5%, balance $N_2$.

The exothermic gas generator 120 is mounted on appropriate structural steel. A pump 126 driven by a motor 128 is conventionally represented in FIG. 17. The pump 126 delivers a predetermined mixture of the hydrocarbon fuel and air to the gas burners 130 which are in communication with the combustion chamber 122 as is the conventional thermo-couple 131. The gas pump and means for proportioning the air-gas mixture are not the subject matter of the present invention, and need not be further described herein. The walls of the generator 120 which define the combustion chamber 122 are formed of a high heat resistant refractory material 134. On the outside of

* Water vapor is based on cooling water at 60° F.

the refractory material 134 is a steel casing or shell 136. Spaced therefrom is an outer metal shell 138. Shells 136 and 138 define a water or cooling jacket 140 which surrounds the combustion chamber 122 to aid in the removal of heat therefrom. The jacket 140 is connected to a source of water supply by a connection 142 as is shown in FIG. 15.

Coke or field stone is placed inside of the contact type of water tower 124. The combustible products enter the contact tower 124 through the opening 144 provided in the gas generator 120. The resulting water vapor drains to the bottom of the contact tower 124 and is removed therefrom through an appropriate outlet connection 146. The remaining products of combustion pass upwardly in the contact tower 124 through the water cooled coke. A continuous spray of water from the spray nozzles 148 is provided in the contact tower 124 and washes the combustible gases as they rise in the contact tower 124. A screen 150 is mounted in the upper part of the contact tower 124 above the spray nozzle 148 and has a aluminum filter 152 placed thereon through which the resulting gas products must pass in order to reach the gas outlet 154 which is connected to the gas inlet 82 provided in the fan housings 76.

In operation, the gas atmosphere from the gas generator 120 enters the inlet connections 82 in the thermocartridge assemblies through suitable plumbing from where the propeller blades 90 accelerate the flow of the gas atmosphere in the cooling tunnel 16 as is shown by the dotted arrows in FIG. 1. It is important in a gas atmosphere controlled type of unit to utilize a closed system by adding gas to the cooling zone and spilling it out at both ends. This prevents oxidation from occurring within the unit. As an example, the gas atmosphere is expelled at the rate of 10,000 c.f.m. to the left and an additional 5000 c.f.m. to the right as is shown by the arrows in FIG. 1. The gas expelled to the right is baffled by the baffles 88 provided in the exit tunnel 64 to maintain a slight pressure inside the unit to prevent air from infiltrating the tunnel. The gas atmosphere expelled to the left flows against the heated stock to remove heat from the stock and thereby enter the heating chamber 14 or furnace at an elevated temperature. Such an arrangement provides for forced convection in the cooling zone.

The gas atmosphere which enters the heating zone 14 at an elevated temperature is held close to the work moving through the furnace by the baffles 40 provided in the heating zone 14. At the entrance end of the heating zone 14 the atmosphere is pulled through the intake opening 31 and passed over the radiant tubes 28 and heat transfer baffles 29 in the upper part of zone 14 by the impeller type fan 30 at the rate of 15,000 cu. ft. per minute. The heated atmosphere is then injected into the work heating chamber or lower part of zone 14 mixing with the atmosphere entering from the cooling zone 16 and transferring heat to the work moving through the furnace. The design of the intake opening 31 and the directional chute 36 and duct 38 is very important to the operation of the heating and cooling system. With the circulating fan 30 running at full capacity and without the addition of generator gas the flow must follow the direction of the solid arrows in FIG. 1 thus maintaining a closed system without air being pulled in or blown out either end of the heat treating unit. With such a system we are able to induce the generator gas addition to flow in both directions and control the flow out both ends of the closed system. FIGURE 1 shows the gas atmosphere represented by dotted arrows being circulated around the radiant tubes 28 and baffles 29 and is thereby elevated to the desired temperature. The atmosphere envelops the work in process and thereby closely controls the surface appearance as well as the chemical and physical property of the work.

The solid arrow in FIG. 1 shows the direction of air flow without the addition of atmospheric gas. When the heat treating unit 10 is initially started it requires approximately 1 to 1½ hours to purge all of the air entrained in the heat treating unit to provide an oxygen free furnace.

The work, such as copper tubing, entering the furnace has the air entrained therein expelled or purged therefrom by means of the back pressure which is created by the baffles provided in the unit. This effects an adequate amount of the protective atmosphere to flow out through the tubing as it enters and leaves the furnace and thereby insure a complete purge of the entrained air.

The heat treating apparatus 10 disclosed herein has provided more efficient cooling and heating cycles thereby resulting in increased production in a given amount of time and space. Previous to this type of a design, larger units were required. Radiant tubes numbering 10 or 12 were mounted crosswise in the furnace. A plurality of propeller type fans were used to mix the furnace atmosphere with little if any control of direction or volume. In addition thereto, each tube required separate burners and corresponding piping.

The applicant has mounted a pair of U-shaped radiant tubes 28 lengthwise in the chamber and has provided zigzag expanded metal baffles 29 around the tubes 28 to provide, in effect, a fin radiator with additional area. The gas atmosphere is circulated around and through the fin radiator in a highly efficient manner. The gas atmosphere is continuously monitored by a gas analyzing device (not shown). Both a visual and audible signal are given should the gas mixture approach a combustible range.

The various sections forming the cooling tunnel 16 have removable covers or plates 52 associated therewith. The cooling section itself is constructed of a single steel shell and provides a highly efficient heat absorbing tunnel. Each cover 52 is placed on an appropriate frame having asbestos putty thereon so as to provide an appropriate seal around the cover and prevent air from entering the cooling chamber. Previously, cooling tunnels have been designed so that a mechanic may crawl into the tunnel from the end thereof. Sufficient space had to be provided to permit maintenance in this manner. By utilizing removable covers 52, it is possible to provide the proper maintenance without actually crawling into the tunnel 16. This feature thereby permits the tunnel 16 to be substantially reduced in size. In addition, the use of copper cooling coils 68 at the top, bottom and sides of the plurality of sections have greatly facilitated the removal of heat from the tunnel 16. Each of the cooling coils 68 are connected by suitable plumbing to a closed water system on one end thereof and to a drain on the other end.

Another important feature of the invention is the utilization of the hot pack gas seal 48. Previously, it has been required to utilize water cooled bearings at a considerable expense near the ends of the rollers where they emerge from the furnace. It is now possible to utilize standard pillow block bearings 44 which are insulated from the furnace by utilizing a simple, economical, trouble-free, and efficient asbestos packed seal as described herein. Various modifications of the asbestos seal may be utilized to suit a particular condition.

Another improvement feature described herein relates to the utilization of a water jacket around the exothermic generator 120. With such water-cooled design it is possible to reduce the size of the generator by utilizing the water jacket in an efficient manner to remove excessive heat generated in the combustion chamber 122 but to efficiently maintain the same rated capacity of 15,000 cu. ft./hr.

In addition, the fiber glass curtains at the inner end of the heating chamber 14 and at the outer end of the cooling system help to create a back pressure in the unit to purge the air entrained in the furnace or in the tubing entering or leaving the furnace. As previously pointed out, it is important that the heat treating unit 10 has a closed system without sucking air in from the front or blowing it out through the exit tunnel.

The duct work installed immediately below the impeller fan prevents the suction of air into the furnace.

The invention described herein is a new conception and is considered at least unorthodox if not radical, based on present standards. The manner of injecting the gas atmosphere into the cooling tunnel contributes to the advanced improvement of the heat treating efficiency, thereby substantially increasing production while reducing the floor space requirements and at the same time substantially reducing the cost of the unit.

Various electrical and mechanical controls not shown are utilized in the unit in a well known manner. In addition, various plumbing is required which is not shown.

The drawings and the foregoing specification constitute a description of the improved heat treating unit in such full, clear, concise and exact terms as to enable any person skilled in the art to practice the invention, the scope of which is indicated by the appended claim.

What I claim as my invention is:

An industrial heat treating apparatus of the indirect type utilizing a controlled inert protective gas atmosphere to provide an airtight apparatus for the processing of non-ferrous metals comprising a heating chamber, means for heating the interior of said heating chamber, said means including a radiant tube mounted in said heating chamber and within which a combustible mixture of gases is burned to radiate heat, a cooling tunnel connected to said heating chamber, conveyor means extending through said heating chamber and said cooling tunnel for moving the work therethrough, means for initially directing an inert protective gas atmosphere which is independent of the products of combustion in said tube into said cooling tunnel where part of the gas atmosphere is expelled through the exit to said apparatus to purge the entrained air and the remaining part of the atmosphere is directed across the work traveling through the cooling tunnel to remove heat therefrom and directed into the heating chamber at an elevated temperature to envelop the work, fan means for continuously circulating the atmosphere around said radiant tube whereby part of the atmosphere in the heating chamber is expelled through the entrance to said apparatus to purge the entrained air, and guide means at the exit end of said heating chamber for directing the flow of the atmosphere circulated by said fan means away from the entrance to said cooling tunnel.

References Cited in the file of this patent

UNITED STATES PATENTS

| | | |
|---|---|---|
| 1,808,152 | Baily | June 2, 1931 |
| 2,049,250 | Darrah | July 28, 1936 |
| 2,085,327 | Payne | June 29, 1937 |
| 2,106,184 | McDonnell | Jan. 25, 1938 |
| 2,191,133 | Pearson | Feb. 20, 1940 |
| 2,233,474 | Dreffein | Mar. 4, 1941 |
| 2,613,070 | Verwohlt | Oct. 7, 1952 |
| 2,713,480 | Ruckstahl | July 19, 1955 |
| 2,844,365 | Rusciano | July 22, 1958 |
| 2,845,260 | Rusciano | July 29, 1958 |
| 2,899,287 | Paris | Aug. 11, 1959 |
| 2,955,062 | Cullen | Oct. 4, 1960 |

OTHER REFERENCES

The Primer of Prepared Atmospheres by Surface Combustion, Toledo, Ohio. Received in Patent Office Library November 17, 1944.

Metal Progress August 1949, pages 194–199.

Kent's Mechanical Engineering Handbook 12 Ed., Design and Production Volume, published by John Wiley & Sons, Inc., New York, N.Y., 1950, pages 18–08.